Feb. 5, 1935.  C. A. FULLERTON  1,989,749
COMBINATION COOKING STOVE AND KITCHEN CABINET
Original Filed June 28, 1930   4 Sheets-Sheet 1
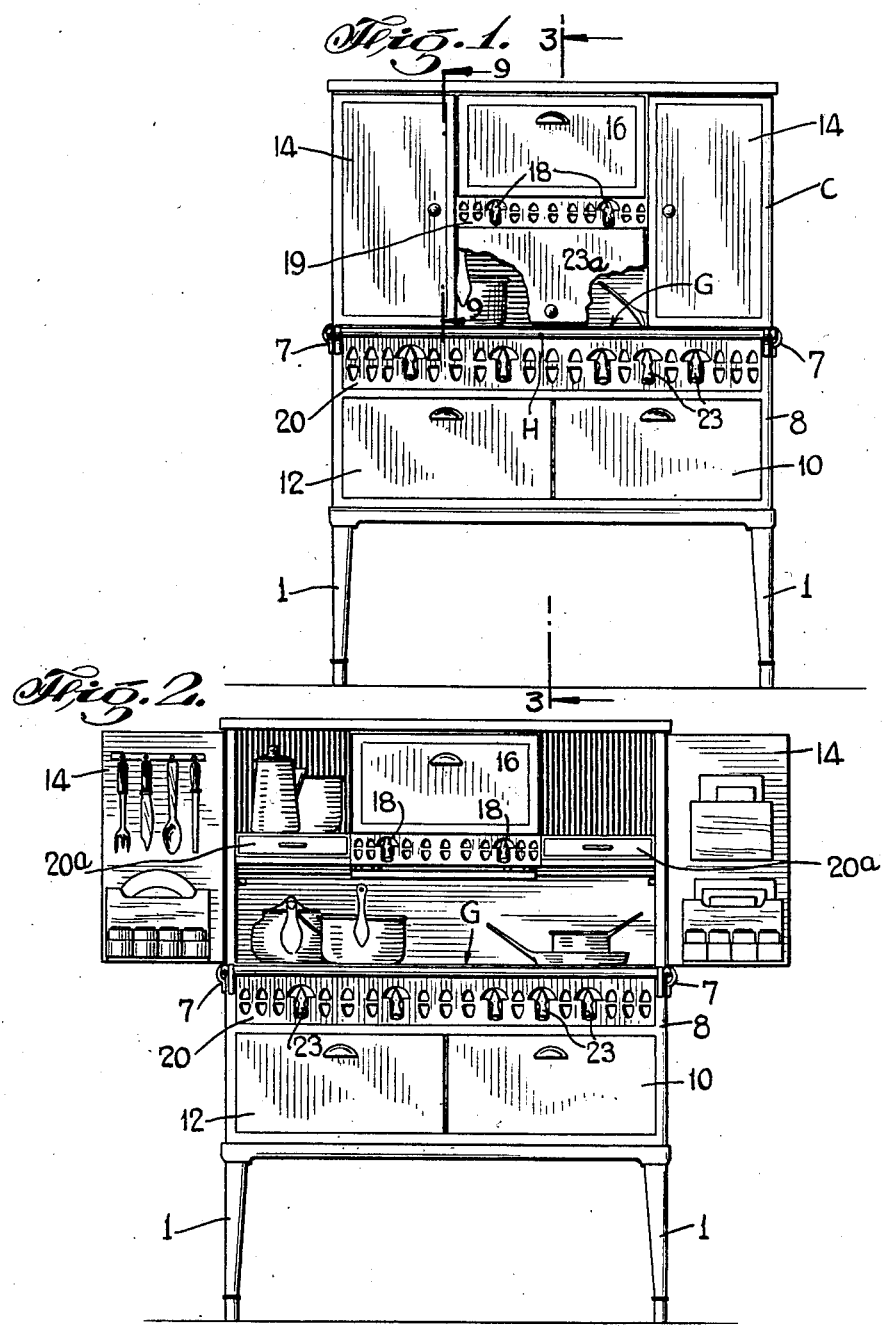

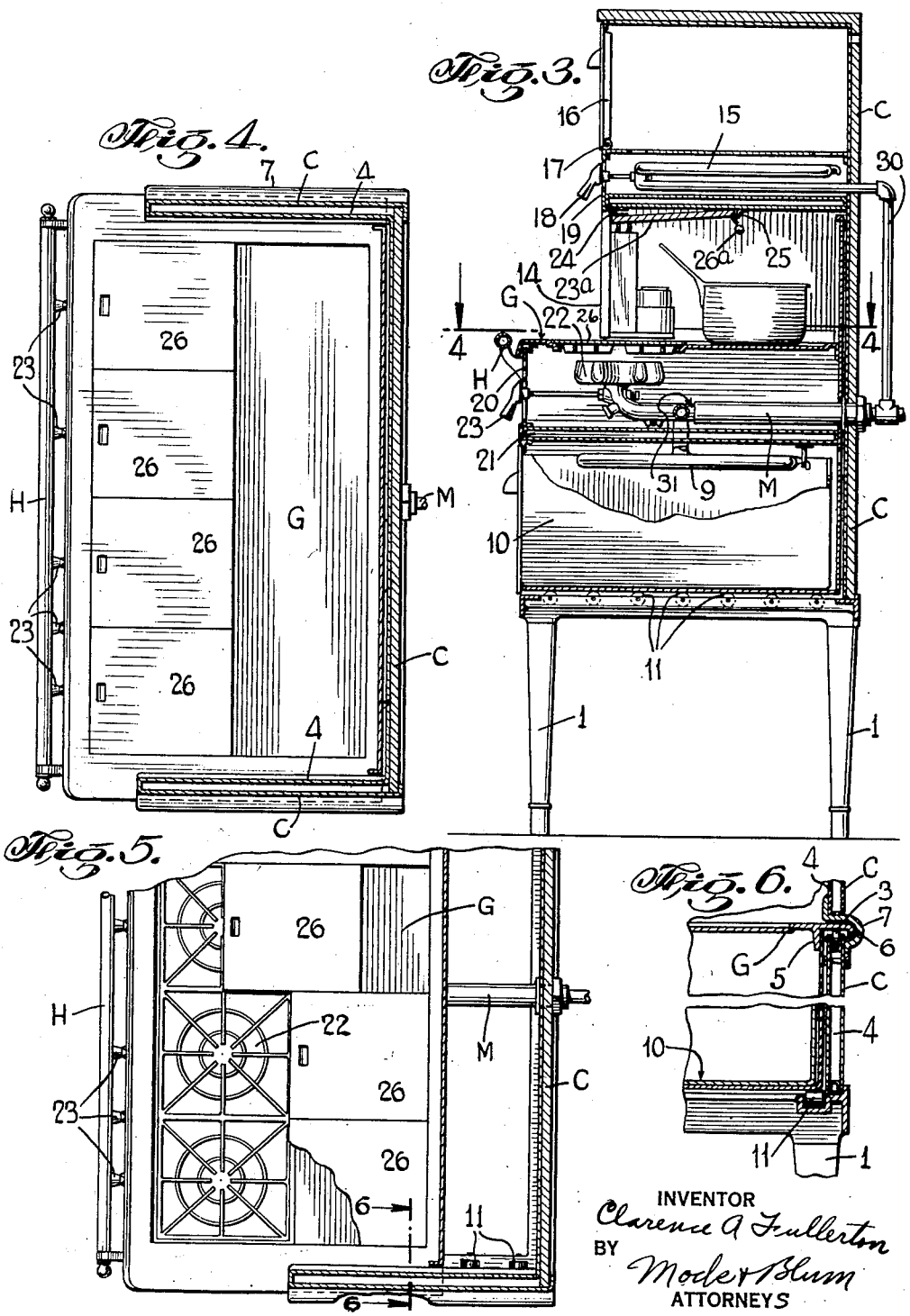

Feb. 5, 1935. C. A. FULLERTON 1,989,749
COMBINATION COOKING STOVE AND KITCHEN CABINET
Original Filed June 28, 1930 4 Sheets-Sheet 3
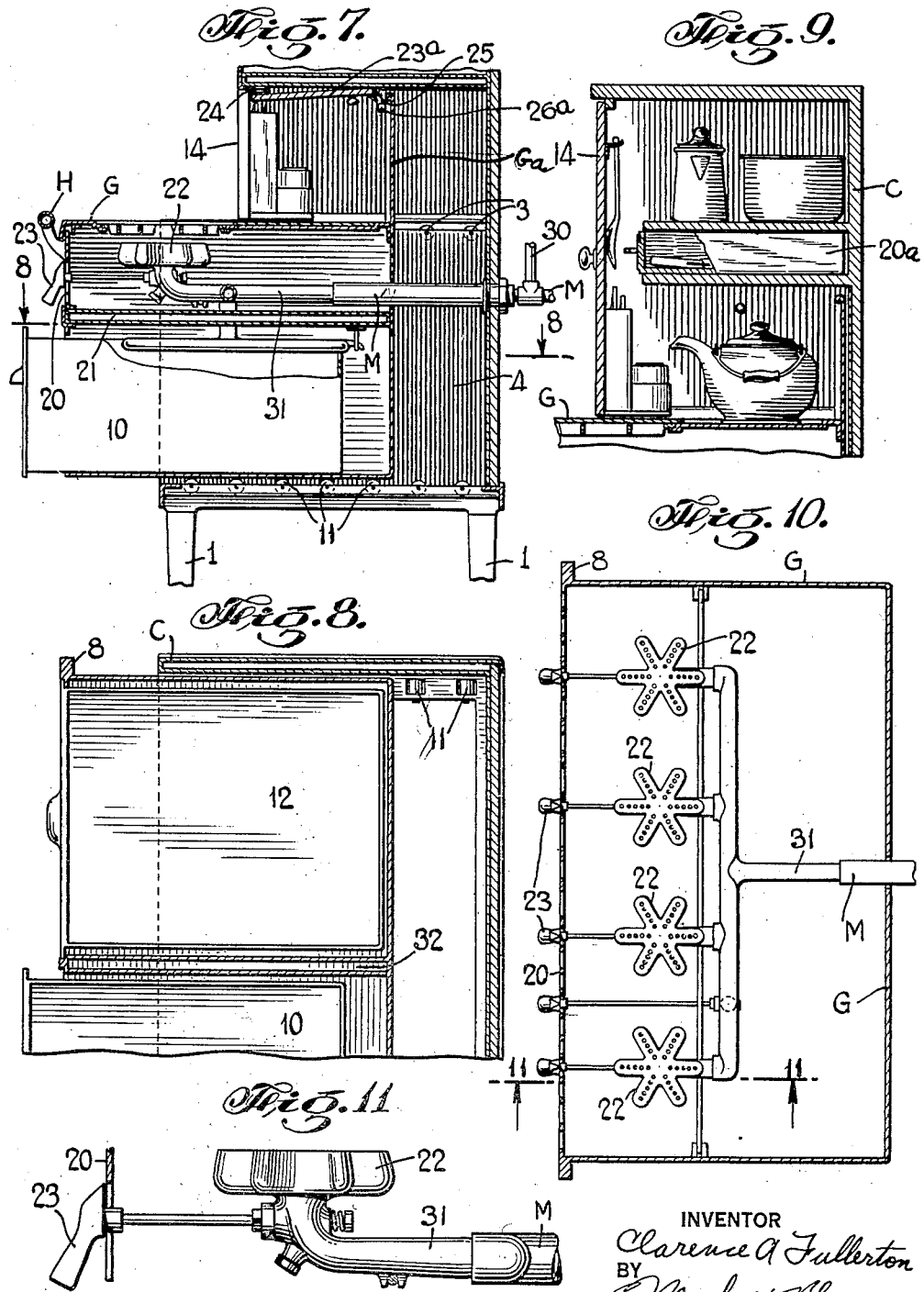

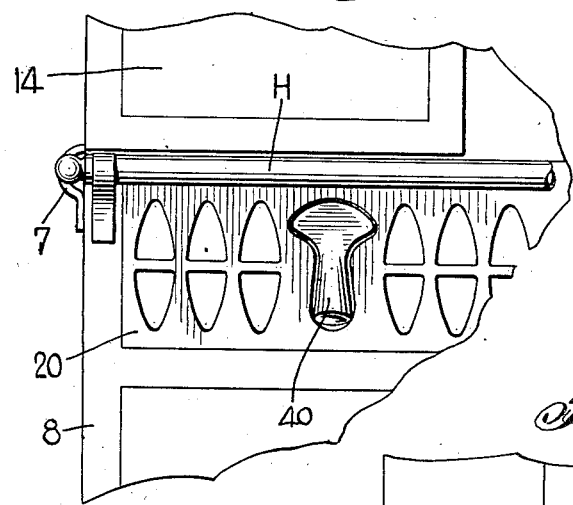
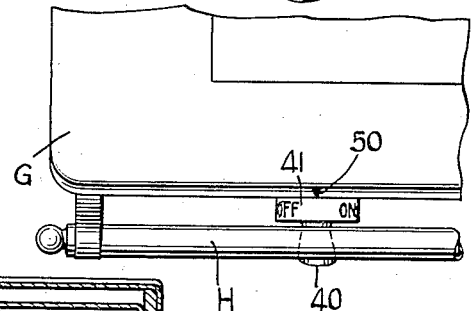
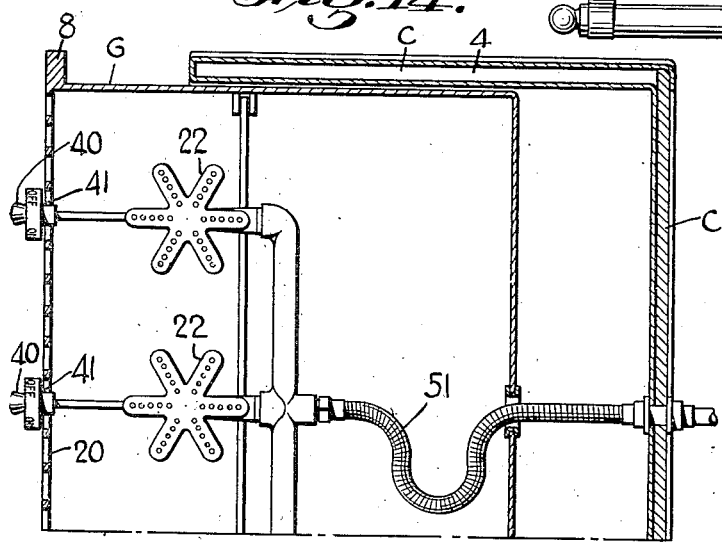

Patented Feb. 5, 1935

1,989,749

UNITED STATES PATENT OFFICE 1,989,749

COMBINATION COOKING STOVE AND KITCHEN CABINET

Clarence A. Fullerton, New York, N. Y.

Application June 28, 1930, Serial No. 464,517
Renewed May 29, 1934

1 Claim. (Cl. 126—37)

My invention relates to a new and improved combination cooking stove and kitchen "dresser" whereby the heavy body of the cooking stove proper is located, enclosed and supported in a kitchen cabinet or dresser.

The major stove receptacles are built into a unit which is movable and operates in drawer-like manner in the enclosing cabinet.

The principle involved in this device is to build some cooking stove units, such as the oven, in the cabinet and superimpose them at a convenient height above the stove's cooking top in a position most convenient for use to the average human adult.

This vertical height is located within the vertical area occupied by horizontal stove top area, and is in such close juxtaposition thereto that it makes the cooking top unavailable for ordinary use in cooking when the stove drawer is enclosed in the cabinet and the unsightly portions of the stove and the attendant utensils are concealed when the device is not in use. When the stove is used for cooking the cook stove top along with the heating elements are drawn out from the cabinet removing the movable heat area of the cooking top from the fixed area occupied by the cabinet, so that free access and ready use of the stove's heating elements are obtained. As these are located at the front of the stove cooking top they are then free to be used.

By this novel means I am enabled to attain my first object, namely to secure all the elements of the ordinary cooking stove arranged into a kitchen cabinet in a new and ornamental way, as well as to obtain new and improved factors of efficiency through their combined use.

Another object of my invention is to provide a new and improved ornamental cooking stove.

Another object is to provide a new and improved ornamental kitchen cabinet or dresser.

Another object of my invention is to provide a new and improved combination stove, range and kitchen cabinet that is ornamental and at the same time efficient, etc.

Another object of my invention is to provide a kitchen range which is movably mounted within a cabinet, so that the range can be enclosed to provide an ornamental appearance when the range is not in use.

Another object of my invention is to provide an improved combination kitchen cabinet and range whereby the heat of the range can be utilized whenever this is desired, and the objects located within the cabinet are protected from the heat of the range, when the range is in use.

Other objects of my invention will be set forth in the following description and drawings which illustrate a preferred embodiment thereof, it being understood that the above general statement of the objects of my invention is intended to generally explain the same, and not to limit it in any manner.

Fig. 1 is a front elevation showing the range located within the cabinet and showing the doors of the cabinet in the closed position. In this view one of the doors is shown as being partially broken away.

Fig. 2 is a view similar to Fig. 1, the range being shown located within the cabinet, the doors of the cabinet being shown in the open position.

Fig. 3 is a sectional view on the line 3—3 of Fig. 1.

Fig. 4 is a sectional view on the line 4—4 of Fig. 3.

Fig. 5 is a detail plan view partially in horizontal section, showing the range pulled to its outer position.

Fig. 6 is a sectional view on the line 6—6 of Fig. 5.

Fig. 7 is a detail vertical sectional view, showing the range in its outer position, and showing the broiler drawer partially slid outwardly.

Fig. 8 is a sectional view on the line 8—8 of Fig. 7.

Fig. 9 is a sectional view on the line 9—9 of Fig. 1.

Fig. 10 is a plan view partially in horizontal section showing the slidable connection for supplying gas to the range.

Fig. 11 is a sectional view on the line 11—11 of Fig. 10.

Fig. 12 is a detail front elevation showing an improved form of gas valve.

Fig. 13 is a top view of Fig. 12.

Fig. 14 shows a different connection for supplying gas to the range.

While many mechanical and other improvements have been made in kitchen ranges, such as gas ranges, electric ranges and the like, little or no improvement has been made in the ornamental appearance of such devices. Likewise, while kitchen cabinets have been very popular for many years, only crude attempts have been made to combine a kitchen cabinet and a kitchen range.

According to my improvements, the kitchen range, which may be of any suitable type, such as gas, electric, oil-heated, is slidably located within a kitchen cabinet.

The cabinet C can be made of metal or any other suitable material, and a range G having a rear wall Ga is slidably mounted within said cabinet. The bottom of the range G is mounted upon rollers 11 which are provided in the bottom of the body of said cabinet C, said body being preferably mounted upon legs 1.

The range G is also provided with hook-shaped lateral extensions 6, as shown in Fig. 6, and these lateral extensions can slide upon rollers 3 which are journaled in a double-walled portion 4 of the cabinet C. Part or all of the wall of the cabinet C can comprise double walls, in order to conserve the heat of the range and for constructional purposes. The body of the cabinet C consists in effect of lower and upper wall portions, which are connected by intermediate members 7, this connection being accomplished by rivets, welding, or any other suitable means. The intermediate wall members 7 are concave so that the hook-shaped extensions 6 of the range G can be located within and move longitudinally in said intermediate wall members 7. The lateral ends of the range G are provided with flanges 5 and these flanges 5 cooperate with the hook-shaped extensions 6 to prevent any substantial lateral movement of the range G within the cabinet C. The front wall of the range G is provided with flanges 8, in order to limit the inner sliding movement of the range. The range G is provided with a broiler or oven compartment or both the broiler having a burner 9. This broiler compartment is provided with a slidable drawer 10 which has no top so that the drawer 10 can be pulled out on the broiler compartment, in order to inspect the food for any other purpose. The range G is also provided with a slidable and removable drawer 12 which can be utilized for holding plates to be heated and the like.

The upper part of the cabinet C is provided with vertically hinged doors 14 which can be used for holding kitchen utensils or any other object. A variety of such objects is illustrated in Fig. 2.

The range is also provided with an oven compartment which is provided with a burner 15. This oven compartment has a door 16, having a horizontal hinge 17 at its lower end. Suitable latches of any type can be utilized for retaining the doors 14 and 16 in their closed position.

In the particular embodiment illustrated herein, a gas range is shown, although the invention applies to any type of range.

The gas range specifically illustrated, has valves 18 for controlling the supply of fuel to the oven burner 15. The supply of gas to the burners 22 is controlled by means of valves 23. The stems of the valves 18 extend through a removable and perforated front plate 19, and the stems of the valves 23 extend through a removable and perforated front plate 20. The plates 19 and 20 can be retained in position by means of a tight fit, or by any suitable releasable fastening means. Their removability facilitates the inspection, cleaning and repair of the parts.

The range can also be provided with additional drawers 20a for holding kitchen utensils or the like.

The rear wall of the cabinet C may be a single wall, and the side walls may be double walls, in order to provide bearings for the rollers 3. The bottom of the range rests slidably on rollers 11.

The gas range G may be provided with a double wall 21 in order to prevent the heat delivered by the burner 9 from rising upwardly, as it is desired to concentrate the heat of the burner 9 upon the food to be broiled. The front of the gas range is provided with a handle H by means of which the range can be slid into or out of position. The cabinet C is provided with a door 23a which is mounted upon a horizontal hinge 24, as shown in Fig. 3, so that the door 23a can be moved inwardly. A latch 25 is utilized for removably holding the door 23a in inward position. When the door 23a is moved inwardly, the range G can be pulled outwardly.

The cabinet is likewise provided with stop pins 26a, which can engage the back wall Ga of the gas range, in order to limit the outer sliding movement thereof. The burners 22 can be covered by means of hot plates 26, which project from the front of the cabinet when the range is in its inner position. These hot plates 26 complete the ornamental appearance of the range, and they can be readily removed whenever desired.

The fuel is supplied to the range through a main pipe connection M and a telescopic pipe 31 is mounted within the pipe M, so that the range can be slid inwardly and outwardly without affecting the supply of fuel. Any suitable and well known means can be provided for making a gas-tight connection between the main pipe M and the pipe 31. A branch pipe 30 supplies fuel to the burner 15.

As shown in Fig. 14, gas can also be supplied to all the burners of the range through a flexible pipe 51.

As shown in Figs. 12, 13 and 14, indicator gas valves 40 can be utilized. These indicator valves 40 have heads 41 upon which any suitable indicating marks may be designated, such as "Off", "On", "Half-on", etc. A fixed indicator 50 is utilized in connection with each head 41, so that the user can readily determine whether the valve 40 is in the open position or in the closed position.

If the range is heated by means of electricity, the construction can remain essentially the same, as the gas supply pipe is merely replaced by a suitable cable or cables for supplying electric current to the various burners and heaters.

The movability of the range to an outer position, in which the burners 22 project beyond the upper part of the cabinet C, is a very important feature of my invention. Otherwise, it would be impossible to practically utilize the device, because the intense heat delivered by the burners 22 would make it inconvenient to use the device, and it would render the device much less desirable.

While I have shown the range as being slidably mounted, it would not be departing from the invention to utilize any other type of movement for withdrawing the range away from the superimposed oven and cabinet. Likewise, in certain aspects of the invention, it is not necessarily limited to having the range movable with respect to the cabinet.

It will be noted that the burners are preferably confined to the front of the range, so that the rear portion of the range may serve to hold pots, etc. This is an important feature of my invention, because it is necessary to slide the range outwardly only for a short distance in order to have the burners clear the cabinet and be uncovered for use. This makes it possible to mount the oven portion at a relatively low height, so that the oven can be at a level about midway between the shoulder and waist of the user. For this purpose the legs 1 may be made adjustable or of varying heights. Of course, the invention is not limited to a device having an oven or any cabinet feature above the burners. The device could merely have a table top above the stove, and the range could be slid out to move the burners beyond said top into usable position. The term range is understood as including any stove or cooking device, or combination of cooking devices. When the range is moved back to inoperative position it can operate a valve or switch to shut off the supply of gas or electricity, which is a valuable safety feature.

It will be noted that the oven compartment of the device is not movable with the range, as this is fixed to the upper part of the cabinet C.

I have shown a preferred embodiment of my invention, but it is clear that numerous changes and omissions can be made without departing from its spirit.

I claim:

A cabinet having a range slidably mounted therein, said range including top burners, and a broiler compartment, said broiler compartment being located below said top burners and having a burner located therein, said range having a double wall between said broiler compartment and the top of said range, and stop means adapted to limit the outward sliding movement of said range with respect to said cabinet so that when said range is slid outwardly, to its extreme outer position, said top burners are located outside of said cabinet, and said broiler compartment is partially located in said cabinet.

CLARENCE A. FULLERTON.